March 31, 1959 J. LEIMBACH ET AL 2,879,687
BRAIDING PROCESS AND APPARATUS
Filed June 7, 1955 6 Sheets-Sheet 1

INVENTORS:
Alfred C. Schneider Paas
and Johann Leimbach
BY: Michael S. Striker

March 31, 1959 J. LEIMBACH ET AL 2,879,687
BRAIDING PROCESS AND APPARATUS
Filed June 7, 1955 6 Sheets-Sheet 5

INVENTORS:
Alfred C. Schneider Paas
and Johann Leimbach
BY:
Michael S. Struker
agt.

INVENTORS:
Alfred C. Schneider Paas
and Johann Leimbach
BY: Michael S. Striker
agt.

United States Patent Office 2,879,687
Patented Mar. 31, 1959

2,879,687

BRAIDING PROCESS AND APPARATUS

Johann Leimbach, Wuppertal-Elberfeld, Germany, and Alfred C. Schneider Paas, Highland Mills, N.Y.

Application June 7, 1955, Serial No. 513,862

Claims priority, application Germany June 9, 1954

10 Claims. (Cl. 87—37)

The present invention relates to braiding machines, to braiding processes, and to a braided article.

One of the objects of the present invention is to provide a braiding process and apparatus capable of uniting a pair of braided articles formed by two braiding heads into a single braided article.

Another object of the present invention is to provide a braiding process and apparatus capable of branching a single braided article into a pair of braided portions.

A further object of the present invention is to provide a continuous braiding process and a continuously operable apparatus capable of uniting a pair of braided articles into a single braided article or capable of branching a single braided article into a pair of braided portions.

An additional object of the present invention is to provide a process and apparatus capable of accomplishing the above objects while maintaining in the single braided article the total number of yarns that are in the pair of braided articles or braided portions.

A still further object of the present invention is to unite a pair of braided articles into a single braided article having a number of yarns greater than the total number of yarns of the pair of braided articles.

Also, it is an object of the present invention to provide an entirely seamless braided article having an elongated portion from which a pair of branches extend, having a closed crotch at the junction between the branches, and suitable for many uses such as electrical and thermal insulation and as an arterial prosthesis.

With the above objects in view the present invention mainly consists of a braiding process which includes the steps of operating a pair of braiding heads to simultaneously form two separate braided articles and switching at a given moment the yarn carriers from the pair of braiding heads to a larger braiding head which includes parts of the pair of braiding heads so that the two separate braided articles are united into a single braided article. Then, if desired, the yarn carriers may be switched back to form from the later single braiding head two separate braiding heads so that two independent braid portions are again formed.

Also, with the above objects in view the present invention mainly consists of a pair of braiding heads and a pair of bridging means bridging the pair of braiding heads to form a single larger braiding head by guiding yarn carriers from part of one braiding head along one bridging means to the other braiding head and from part of the latter braiding head back along a second bridging means to the said one braiding head. A switching means is located at the junctions between the braiding heads and bridging means and has one position for directing yarn carriers from the braiding heads to the bridging means and another position for preventing yarn carriers from moving from the braiding heads to the bridging means.

Furthermore, with the above objects in view the present invention mainly consists of a braided article composed of an elongated seamless braided portion and a pair of seamless braided branches extending from the braided portion, the braided portion and branches merging uninterruptedly into each other and having a closed crotch at their junction.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings, in which:

Figure 9:
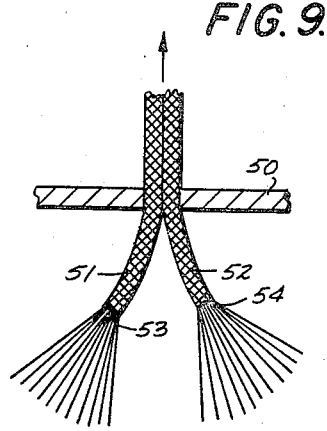
Figure 10:
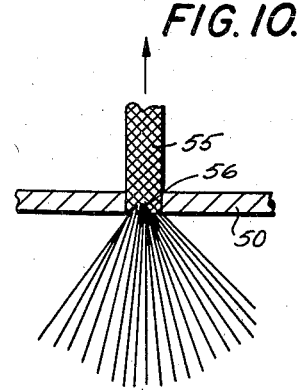
Figure 11:
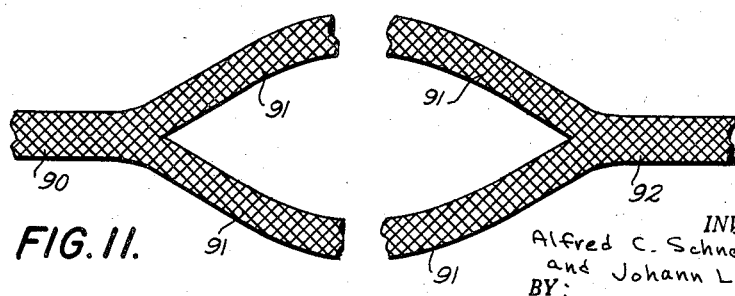

Fig. 9 diagrammatically shows a pair of braiding points and the manner of guiding a pair of separate braided articles;

Fig. 10 diagrammatically illustrates the manner in which a single braided article formed from the two braided articles of Fig. 9 is guided, and Fig. 10 also shows the braiding point of this single braided article; and Fig. 11 is a fragmentary illustration of an article constructed in accordance with the present invention.

Figure 1:
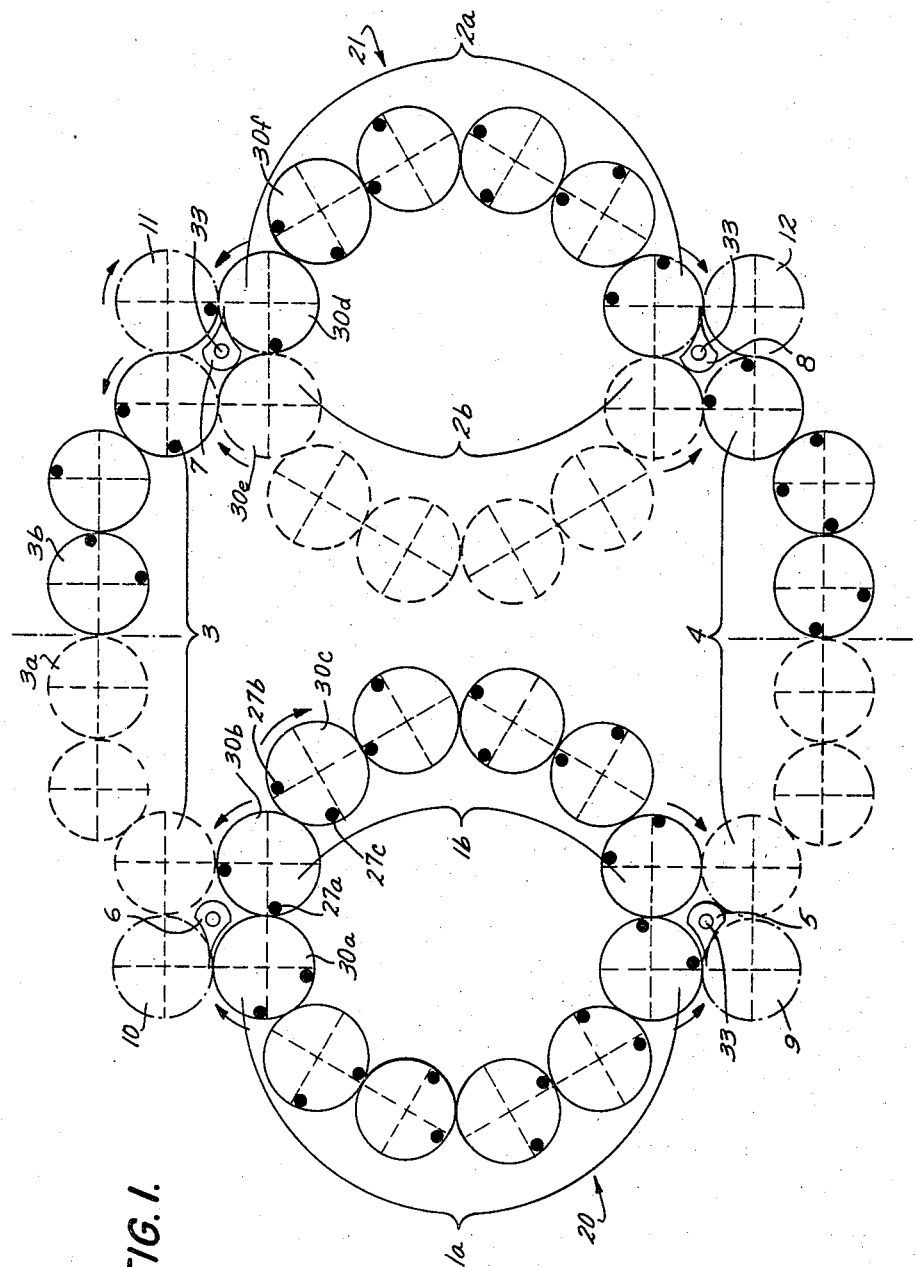
Fig. 1 is a diagrammatic illustration of one process and apparatus according to the present invention.
Figure 2:
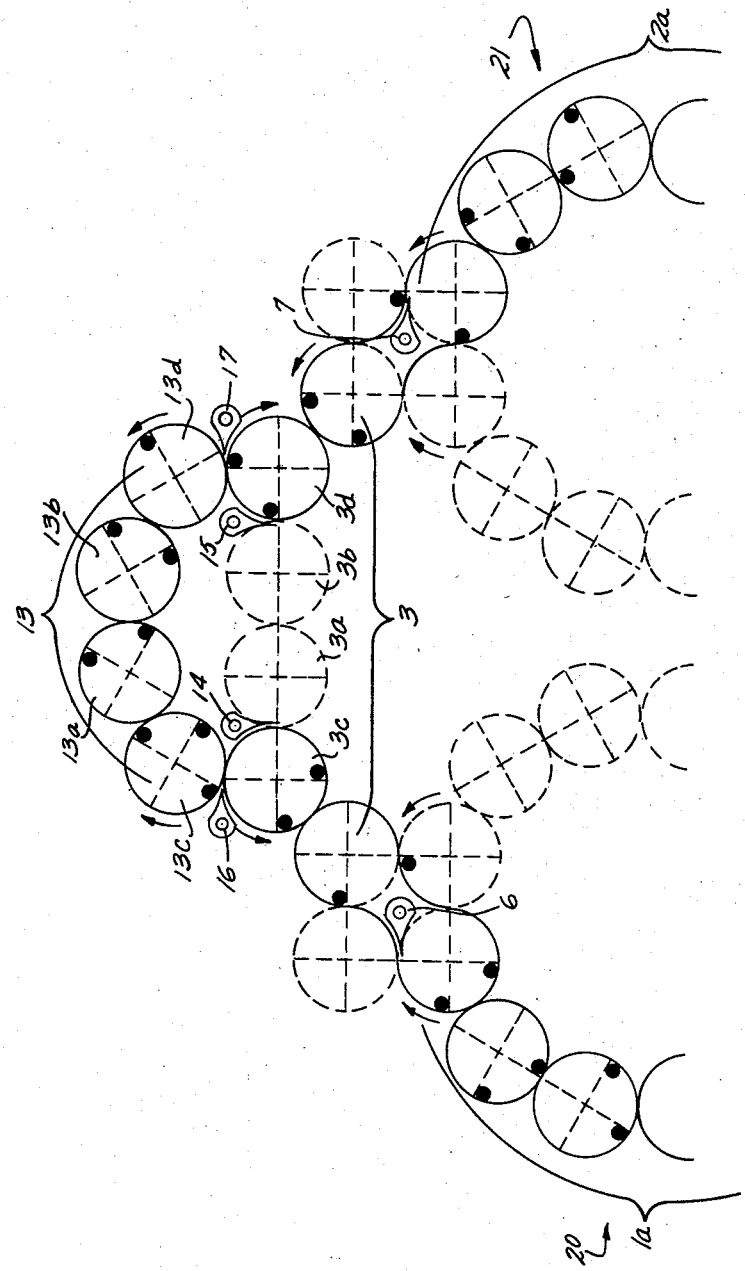
Fig. 2 is a fragmentary diagrammatic illustration of and other embodiment of a process and apparatus according to the present invention.
Figure 3:
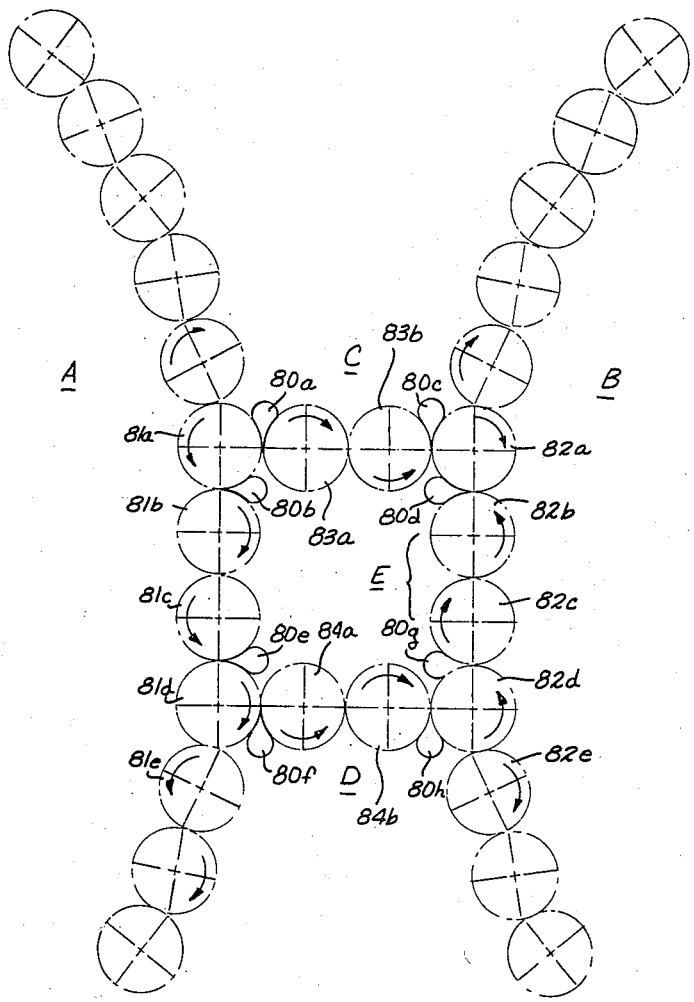
Fig. 3 is a fragmentary diagrammatic illustration of still another embodiment of a process and apparatus according to the present invention.

Referring now to the drawings, Figs. 1–3 of the drawings show three distinct arrangements which are possible in accordance with the present invention, while Figs. 4–7 illustrate constructive details of the embodiment of Fig. 1. However, it is to be understood that these details are only shown in association with the embodiment of Fig. 1 by way of example and may also be used with the embodiments of Figs. 2 and 3, minor changes of the structure of Figs. 4–7 in order to adapt it for use with the embodiments of Figs. 2 and 3 being clearly within the capabilities of those skilled in the art.

Figure 4:
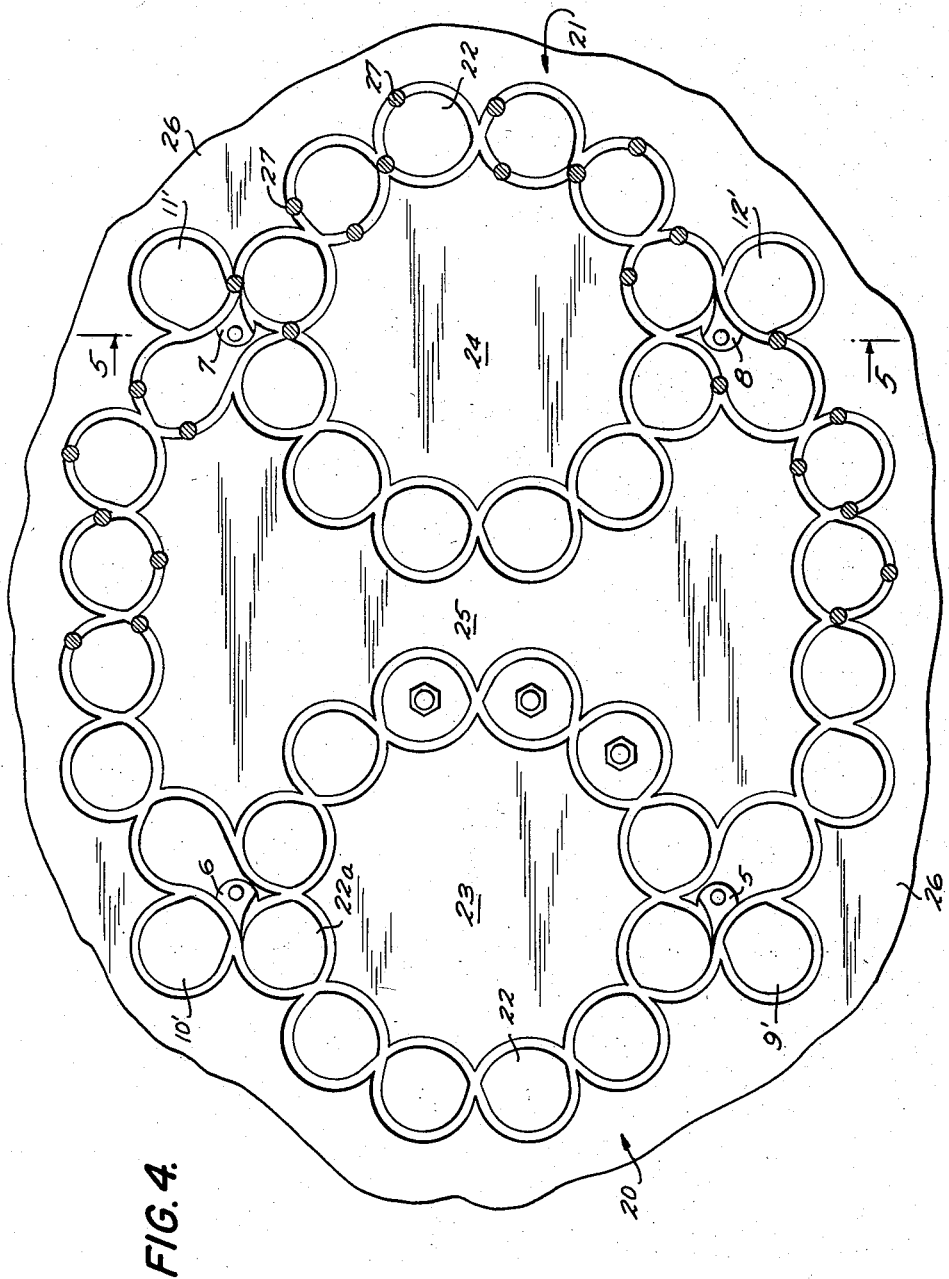
Fig. 4 is a partly sectional top plan view of the structure illustrated diagrammatically in Fig. 1.
Figure 5:
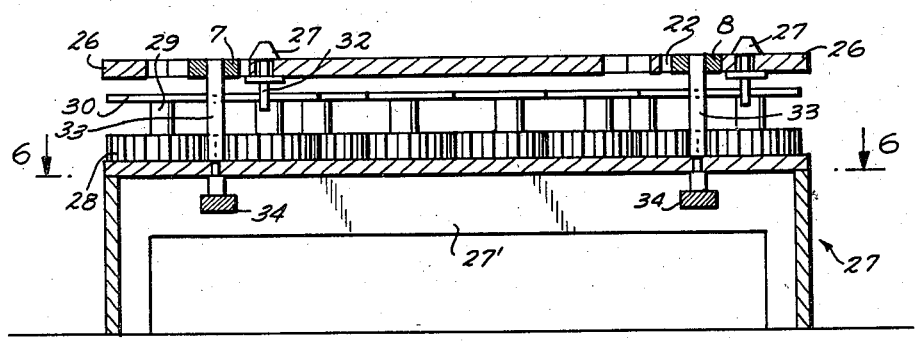
Fig. 5 is a sectional elevational view taken along line 5—5 of Fig. 4 in the direction of the arrows.

Referring to Figs. 4 and 5, it will be seen that a pair of braiding heads 20 and 21 are provided. These individual braiding heads 20 and 21 may be of a conventional construction and include the quoits 22 located between the peripheries of the plates 23, 24, 25, and 26 to form the path indicated in Fig. 4 for the yarn carriers 27, some of which are indicated in Fig. 4. These yarn carriers are of a purely conventional construction well known to those skilled in the art. Thus, it will be seen that the quoits 22 form with the plates 23—26 sinuous endless tracks along which the yarn carriers are guided in a known way, the yarn moving from bobbins on the carriers up to predetermined braiding points, as is well known.

Referring to Fig. 5 it will be seen that a support 27 carries and turnably supports a plurality of gears 28 respectively located beneath the quoits, these gears being turnable about bolts which are fixed to the support 27, which extend upwardly therefrom, and which carry the quoits at a given distance above the support 27. The quoits of each braiding head 20 and 21 are arranged substantially along a circle, and the gears 28 respectively beneath the quoits of each braiding head mesh with each other, one of these gears being driven from any suitable source of power so that all of the gears rotate, with each pair of meshing gears rotating in opposite directions, respectively. Each gear 28 carries and is fixed to a tubular spacer 29 through which the bolt which carries the quoit freely extends, and fixed to the top of each spacer is a horn gear 30, which may have the construction illustrated in Fig. 7. Thus, referring to Fig. 7 it will be seen that each horn gear 30 is formed with four radial notches 31 spaced at 90° from each other. The horn gears are respectively above the gears 28 and spacers and are immediately below the quoits.

Referring to Fig. 1, it will be seen that the horn gears of the braiding heads 20 and 21 are indicated by circles with the notches indicated by the dotted-line diameters of these circles which cross each other. The yarn carriers 27 have flanges which extend across the tracks defined by the quoits and plates and which slidably engage the quoits and plates at their top and bottom surfaces, and each yarn carrier has below its bottom flange a depending pin portion 32 which extends into a notch 31 of a horn gear so that as the latter rotates the yarn carriers are advanced along sinuous paths. For example, referring to the braiding head 20 shown in Fig. 1, it will be seen that the horn gear 30a turns in a clockwise direction and that this horn gear in cooperation with the quoit 22a (Fig. 4) has just shifted the yarn carrier 27a into a notch of the horn gear 30b which turns in a counterclockwise direction as viewed in Fig. 1 and which has just transferred the yarn carrier 27b to a notch of the horn gear 30c. In this way the yarn carriers follow a sinuous path located along a circle. At the same time, the yarn carrier 27c is about to be transferred to a notch of the horn gear 30b which will then transfer this yarn carrier to the horn gear 30a. Thus, two series of carriers are provided in each braiding head and respectively move in opposite directions along sinuous endless paths, as is well known in the art.

The above described structure is capable of being operated to provide simultaneously two separate braided articles which may be, for example, a solid braid or cord, or a hollow, tubular braid, or the like. In accordance with the present invention, the above described structure is associated and operated in conjunction with additional structure which makes it possible to unite a pair of braided articles into one braided article or to branch a single braided article into a pair of braided portions. Thus, referring to Fig. 1 it will be seen that in addition to the horn gears of the braiding heads 20 and 21, horn gears 9, 10, 11 and 12 are provided, the quoits 9', 10', 11', and 12' respectively located over these horn gears being shown in Fig. 4. The horn gears 9—12 are respectively associated with drive gears which respectively mesh with driving gears of the braiding heads 20 and 21. In addition, a group of horn gears 3 indicated at the upper portion of Fig. 1 extend between the horn gears 10 and 11, and a second group of horn gears 4 extend between the horn gears 9—12. As is evident from Fig. 4, the groups of horn gears 3 and 4 are respectively provided with quoits located thereover and furthermore these horn gears are respectively connected to driving gears which mesh with each other according to the arrangement of horn gears shown in Fig. 1.

Each unit composed of a driving gear, horn gear, and quoit forms a moving means for moving the yarn carriers 27, and it is evident from Fig. 1 that each of the braiding heads 20 and 21 is composed of twelve such moving means. Moreover, as is apparent from Fig. 1 the braiding heads 20 and 21 are respectively composed of an inner group of moving means 1b and 2b located adjacent to each other and outer groups of moving means 1a and 2a, respectively, located distant from each other. Each of these latter groups is composed of six moving means. It will furthermore be noted that there are six horn gears 3 which respectively form part of six moving means bridging the braiding heads 20 and 21 and that there are six horn gears 4 respectively forming parts of six additional moving means also bridging the braiding heads 20 and 21.

In accordance with the present invention a switching means is provided for switching yarn carriers between the braiding heads 20 and 21 and the two bridging means which include horn gears 3 and 4. This switching means includes the switch members 5—8 which are respectively located at the junctions between the braiding heads and bridging means, as indicated in Fig. 1. As is clearly shown in Fig. 4, the switches 5—8 respectively form part of the tracks with the quoits and plates. In Fig. 4 the switches 5—8 are shown in the position which they take when they switch the yarn carriers 27 to the bridging means, and in the right half of Fig. 1 the switches 7 and 8 are shown in the same position, while the left half of Fig. 1 shows the switches 5 and 6 in the position which they assume to prevent the yarn carriers from moving to the bridging means. Of course, it is to be understood that all four switches 5–8 are controlled by a linking structure such as that shown in Fig. 6 and described below in such a way that they all are in a position which prevents movement of the yarn carriers to the bridging means or in another position which compels movement of the yarn carriers to the bridging means, as desired.

The switches 5—8 are respectively fixed to elongated rods 33, all of which are of the same construction, and the rods 33 respectively fixed to the switches 7 and 8 are shown in Fig. 5. As is apparent from Fig. 4 the quoits which are located over the first and last gears of the bridging means are formed with cutouts into which the switches extend, and the rods 33 are respectively fixed to these latter switches. The rods 33 (Fig. 5) extend downwardly through the top wall of the support 27 and are provided with shoulders engaging the top face of this top wall so that the rods 33 are carried by the support 27 for turning movement about their axes, respectively. At their lower end portions which extend downwardly beyond the top wall of the support 27, the pair of rods 33 which are fixed to the switches 7 and 8 are respectively fixed to a pair of levers 34, while the rods 33 respectively fixed to the switches 5 and 6 are fixed at their lower ends beneath the top wall of support 27 to a pair of levers 35. The switches 5—8 are indicated in dot-dash lines in Fig. 6. The levers 34 respectively extend over the levers 35 and are respectively formed with elongated slots 36 through and beyond which extend a pair of pins 37 fixed to the levers 35. A pair of links 38 respectively extend over the levers 34 and are respectively pivotally connected at one of their ends to the pins 37 while being pivotally connected to each other at their opposite ends, in the manner indicated in Fig. 6. The support 27 is provided about the periphery of the top wall thereof with a downwardly extending skirt 27', and this skirt is formed with an opening through which slidably extends a bar 39 which is pivotally connected at its right end, as viewed in Fig. 6, to the pivot pin which pivotally interconnects the links 38. A pair of collars 40 and 41 are slidable along the bar 39, are respectively located on opposite sides of the portion of skirt 27' shown in Fig. 6, and may be adjustably fixed to desired portions of bar 39 by set screws or the like. At its outer left end, as viewed in Fig. 6, the bar 39 is provided with a handle 42. Furthermore, the portion of skirt 27' shown in Fig. 6 pivotally carries a releasable lock member 43 which is manually turnable to and from the position shown in Fig. 6 where it extends over the collar 40 to prevent movement of bar 39 to the left, as viewed in Fig. 6. A spring 44 extends between and is connected to the pair of levers 34 to urge the left ends of these levers, as viewed in Fig. 6, toward each other, while a spring 45 interconnects the levers 35, as shown in Fig. 6, to urge the right ends of these levers toward each other, as viewed in Fig. 6.

Figure 6:
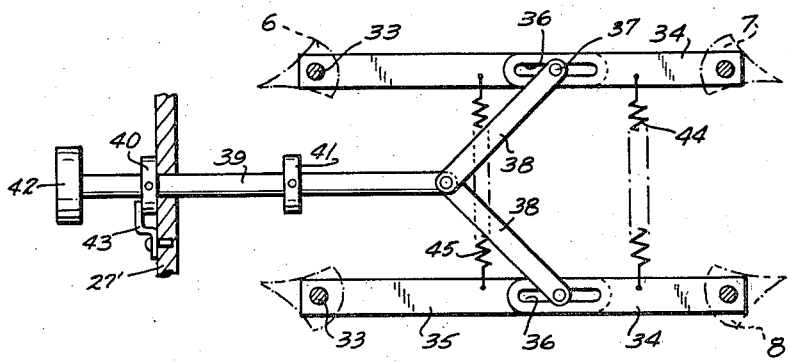
Fig. 6 is a fragmentary, sectional plan view taken along line 6—6 of Fig. 5 in the direction of the arrows and showing one possible mechanism for operating switches used in the invention.
Figure 7:
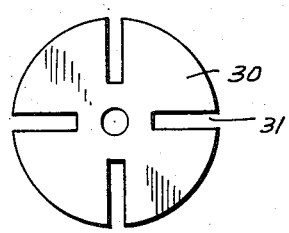
Fig. 7 shows one of the horn gears used in the structure of the invention.

In the position in which the linkage is shown in Fig. 6, the switches 5—8 are positioned as indicated in Fig. 4 where they move the yarn carriers from the braiding heads 20 and 21 to and from the bridging means. It is apparent that when the lock 43 is turned away from the collar 40, the springs 44 and 45 will immediately act to turn switches 6 and 8 in a clockwise direction and switches 5 and 7 in a counterclockwise direction, as viewed in Figs. 4 and 6, in order to simultaneously place all of the switches in a position where they prevent the yarn carriers from moving to the bridging means. In order to place the switches 5—8 again in the position indicated in Figs. 4 and 6, it is only necessary for the operator to push the handle 42 toward the portion of skirt 27' shown in Fig. 6 until collar 40 engages this skirt portion, and then the lock member 43 may be turned to the position shown in Fig. 6 to retain the switches in this position. As is apparent from Fig. 6, the collars 40 and 41 serve to determine the end positions of the switches.

If the switches 5—8 are in the position indicated for the switches 5 and 6 in Fig. 1, the yarn carriers will move only in the individual braiding heads 20 and 21 and two independent articles will be braided. Thus, referring to the left portion of Fig. 1, it will be seen that the clockwise turning horn gear 30a will bring yarn carriers into engagement with the switch 6 which in the position shown in Fig. 1 will prevent these yarn carriers from moving to the horn gear 10 and will compel them to move to the horn gear 30b. The counterclockwise turning horn gear 30b then transfers the yarn carriers to the clockwise turning horn gear 30c. Of course, as was pointed out above, a second series of yarn carriers, one of which is shown at 27c in Fig. 1, moves in the opposite direction along a sinuous path from horn gear 30c to the horn gears 30b, 30a, etc. The braiding head 21 operates in the same way.

When it is desired to combine the two braided articles formed by the independent braiding heads 20 and 21 into a single braided article, the switches 5—8 are turned to the position indicated in Fig. 4 and shown in the right half of Fig. 1. Thus, the counterclockwise turning horn gear 30d will be prevented by the switch 7 from transferring any yarn carriers to the clockwise turning horn gear 30e and instead yarn carriers which horn gear 30d receives from the clockwise turning horn gear 30f will be compelled by the switch 7 to be transferred to the clockwise turning horn gear 11 which then transfers the yarn carriers to the rightmost horn gear of the group of horn gears 3 shown in Fig. 1. Thus, the series of yarn carriers which move in a counterclockwise direction about the center of the braiding head 21 are prevented from moving along the inner group of moving means 2b and instead are compelled to move to the left along the bridging means which includes the horn gears 3.

In the same way the switch 6, which now has the position indicated in Fig. 4, compels yarn carriers which move in a clockwise direction about the center of the braiding head 20 to move from the group of moving means 1a to the horn gear 10 and from the latter to the right along the bridging means which includes the horn gears 3 shown in Fig. 1. The yarn carriers 27 which thus move to the right along the horn gears 3, as viewed in Fig. 1, are transferred by the counterclockwise turning rightmost horn gear 3 of Fig. 1 to the clockwise turning horn gear 30e and from the latter to the horn gear 30d and so on in a clockwise direction around the center of braiding head 21 along the outer group of moving means 2a. In the same way the switches 5 and 8, when they are in position indicated in Fig. 4, direct the clockwise progressing series of yarn carriers, as viewed in Fig. 4 from the outer group of moving means 2a of the braiding head 21 to the left along the bridging means which includes the horn gears 4 and the counterclockwise progressing series of yarn carriers from the group of moving means 1a to the right along the bridging means which includes the group of horn gears 4. Thus, after the switches 5—8 have been moved to the position indicated in Fig. 4, the two groups of moving means 1a and 2a of the braiding heads 20 and 21 will have been combined with the two bridging means to form a single braiding head moving the same number of yarn carriers as the two braiding heads 20 and 21, since the groups of moving means 1b and 2b no longer move any yarn carriers as the latter are kept out of moving means 1b and 2b by the switches, the moving means 1b and 2b simply idling at this time. The yarns are now fed to a single braiding point so that the two braided articles are combined into one having the same number of yarns as the total number of yarns of the two separate braided articles.

Figs. 9 and 10 diagrammatically illustrate the operation when there are two braiding points and when there is one braiding point, respectively. Thus, in Fig. 9 is shown a stationary member 50 formed with an eye through which passes both of the separate braided articles coming from the braiding heads 20 and 21. It will be seen that the two braided articles 51 and 52 are under tension and pulled to the right and left below member 50 toward the braiding heads. The braiding points 53 and 54 tend to pull toward the braiding heads, but these braiding points are maintained nearer to element 50 than would otherwise be the case by the tension in the braided articles 51 and 52 provided by the conventional roller take-up device of the braiding machine. When the two braided articles are combined into a single braided article, the braiding points 53 and 54 automatically merge into one braiding point 56 of the braided article 55 shown in Fig. 10, and the tension on article 55 is such that the braiding point 56 is maintained within the eye of member 50. When the machine is actuated to again braid two separate articles, then the two braiding points 53 and 54 are again automatically provided and they find their own level in a fully automatic manner beneath the member 50. Thus, by passing the separate braided articles 51 and 52 through a single eye no difficulties are encountered in changing over from two to one braiding point or vice versa.

As is shown in the right portion of Fig. 1, the solid line parts of the horn gears serve to move the yarn carriers when both braiding heads 20 and 21 are combined into a single braiding head, while the dotted line portions of the horn gears no longer take part in the operations.

When it is desired to branch the single braided article again into two single braided portions, the switches 5—8 are turned back to the positions corresponding to that shown for the switches 5 and 6 in Fig. 1. Thus, in this position of the parts the series of yarn carriers moving in a clockwise direction about the single combined braiding head are prevented from moving to the pair of bridging means by the switches 6 and 8, while the yarn carriers moving in a counterclockwise direction are prevented from moving to the bridging means by the switches 5 and 7, and thus two independent braiding heads 20 and 21 are formed from the single combined braiding head and two independent braided portions are provided.

Fig. 2 shows diagrammatically the upper half of the embodiment of Fig. 1 to which has been added an additional bridging means which includes four additional moving means each of which includes a horn gear 13, and also additional switches 14—17 are provided as indicated in Fig. 2. Suitable quoits are respectively located over the horn gears 13, and the switches 14—17 are in fact turnable tips of the plates whose peripheries cooperate with the quoits over gears 13 and 3 to form the tracks for the yarn carriers. In the position of the parts shown in Fig. 2 the switches 14 and 15 have their tips in engagement with the quoits over the central pair of horn gears 3a and 3b to form with these quoits continuous tracks which prevent movement of yarn carriers to the horn gears 3a and 3b shown in Fig. 2. When the switches 14 and 15 are in this position, the switches 16 and 17 are in a neutral position, which is to say they are in a position where switch 16 is equidistantly spaced from the quoits over the horn gears 3c and 13c indicated in Fig. 2 so that the yarn carriers may pass between these horn gears in this position of switch 16, and in the same way the switch 17 is equidistantly spaced from the quoits over the horn gears 3d and 13d to provide an open track between these horn gears so that yarn carriers may be transferred therebetween. Thus, with the position of switches 14—17 indicated in Fig. 2, the switches 14 and 15 compel yarn carriers to be transferred between the horn gears 3c and 13c on the one hand and the horn gears 3d and 13d on the other hand, the switches 14 and 15 preventing carriers from moving to the central pair of horn gears 3a and 3b shown in Fig. 2. When the switches 14 and 15 are moved to the position indicated in Fig. 2 the switches 16 and 17 are simultaneously placed in their neutral position described above and shown in Fig. 2, and in this position they do not influence yarn carriers approaching from either direction. The horn gears 3c, 3d, 13c, and 13d rotate in the directions indicated by the arrows in Fig. 2.

On the other hand, the switches 14—17 each have another position where the switches 14 and 15 are in a neutral position and where the switches 16 and 17 engage the quoits over the horn gears 13c and 13d, respectively, in order to prevent yarn carriers from moving to the group of horn gears 13. In order to place these switches in this latter position switches 14 and 17 are turned in a clockwise direction from the position shown in Fig. 2 and the switches 15 and 16 are turned in a counterclockwise direction from the positions shown in Fig. 2. In their neutral positions the switch 14 is spaced from the quoits over horn gears 3a and 3c and the switch 15 is spaced from the quoits over the horn gears 3b and 3d so that yarn carriers are now free to move between horn gears 3a and 3c and between horn gears 3b and 3d. Thus, with switches 14 and 15 in their neutral position and switches 16 and 17 in engagement with the quoits over horn gears 13c and 13d, respectively, the latter switches 16 and 17 will compel the yarn carriers to traverse the bridging means described above in connection with Fig. 1 and the yarn carriers will be prevented from being transferred to the horn gears 13 so that the embodiment of Fig. 2 will now operate in the same way as the embodiment of Fig. 1. Of course, it is to be understood that only one half of the embodiment of Fig. 2 actually is illustrated in Fig. 2 and that the structure shown in Fig. 2 is symmetrically repeated so that the embodiment of Fig. 2 differs from that of Fig. 1 in that two additional bridging means, one of which is indicated at 13 in Fig. 2, are provided and in that a set of switches 14—17 in addition to that shown in Fig. 2 is provided.

Thus, with the embodiment of Fig. 2 it is possible to combine the pair of braiding heads 20 and 21 into a single braiding head which braids an article having more yarns than the total number of yarns of the two articles braided by the braiding heads 20 and 21. It should be noted, however, that when the machine is to be operated with the horn gears 13 it is necessary to stop the machine after switches 5—8 have been opened to the bridging means shown in Fig. 1 and included in Fig. 2 and when yarn carriers have advanced almost up to switches 14 and 15 and are located just ahead of the latter switches. It is at this time that the switches 14—17 are turned to the positions discussed above where switches 16 and 17 are neutral and switches 14 and 15 prevent yarn carriers from entering horn gears 3a and 3d. The outer plate which is located along the quoits over horn gears 13 to form a track therewith has a removable section at its tip between the two quoits respectively over the central horn gears 13a and 13b. This tip section is removed at this time and four additional yarn carriers, two in each direction, are inserted into the horn gears 13, after which the removable tip section is replaced. The horn gears are manually turned in order to enable the yarn carriers to be inserted. This is a conventional way of adding carriers and is not illustrated in the drawings. The same operation of course takes place at the opposite end of the machine not illustrated in Fig. 2, and since there are two carriers for each horn gear and four additional gears are provided in the outer pair of bridge means one of which is indicated at 13 in Fig. 2, eight carriers must be added to the total from the braiding heads 20 and 21. Now the machine is started and it produces a single braided article having eight more strands of yarn than the total of the two braiding heads 20 and 21. After the article is completed the free ends of the added strands of yarn are cut therefrom.

When it is desired to braid again with two individual braiding heads it is also necessary to stop the machine in order to remove the eight additional yarn carriers so that they wll not enter into the braiding heads 20 and 21, and this is accomplished by the reverse of the operation described above. Also, after these additional yarn carriers have been removed the free ends of the strands of yarn of these additional carriers are cut from the finished article.

Thus, with the embodiment of Fig. 2 it is possible to combine two braided articles into a single braided article having more yarns than the total of the two braided articles and it is possible to branch a single braided article into two braided portions having a total of yarns less than that of the single braided article, but in order to accomplish this result it is necessary to interrupt the operations. In contrast with the embodiment of Fig. 1 it is possible to combine two braided articles into a single braided article and to branch a single braided article into two separate braided portions without interrupting the operations, but it is not possible with the embodiment of Fig. 1 to provide additional strands of yarn.

One possible mechanism for turning both sets of switches 14—17 between their positions described above is indicated in Fig. 8. Rods 60 are respectively fixed to the switches 14—17 in the same way that the rods 33 are fixed to the switches 5—8, and these rods 60 are supported for turning movement about their axes, respectively, by the support 27 in the same way as the rods 33. Beneath the top wall of the support 27 the rods 60 respectively carry the gears 61—64 and 61'—64' indicated in Fig. 8. These gears are respectively fixed to the rods 60 in order to turn the latter, and these gears are spaced below the top wall of the support 27. The gears are grouped in meshing pairs 61 and 62, 63 and 64, 61' and 62', and 63' and 64'. The gears 62, 63, 62', and 63', fixedly carry pins 65, 66, 65', and 66' which extend upwardly from the top faces of these gears in the manner indicated in Fig. 8, the pins 65 and 66 extending through an elongated slot formed in a bar 67 while the pins 65' and 66' extend through an elongated slot formed in a bar 67'. A spring 68 is connected to and urges these latter bars toward each other. The bars 67 and 67' fixedly carry pivot pins 69 and 69' which extend upwardly from these bars into a straight groove formed in the underside of the top wall of support 27 and extending in a direction normal to the bars 67 and 67'. A pair of links 70 are respectively linked at one of their ends to the pivot pins 69 and 69' and are pivotally interconnected at their opposite ends. A bar 71 is pivotally connected at its right end, as viewed in Fig. 8 to the pivot pin which interconnects the link 70, and this bar 71 slidably extends through an opening in the skirt portion 27', as a handle 72 at its outer end, and carries a pair of collars 73 and 74 which may be fixed at any desired location along the bar 71 to determine the distance through which bar 71 is shifted so as to determine the end positions of the switches, a releasable lock member 75 indentical with lock member 43 being provided to cooperate with collar 73 for retaining the parts in the position shown in Fig. 8 against the force of the tensioned spring 68. The several switches are shown in dot-dash lines in Fig. 8 in the position where switches 16 and 17 are neutral, in other words in the position indicated in Fig. 2. It is apparent that when the lock member 75 is turned out of engagement with collar 73 spring 68 will immediately turn all of the switches indicated in Fig. 8 to their other position where switches 14 and 15 are neutral, and handle 72 need only be advanced toward the portion of skirt 27' shown in Fig. 8 in order to return the switches to the position shown in Fig. 8, lock 75 then being returned to the position of Fig. 8.

Fig. 3 shows a somewhat different arrangement capable of accomplishing the same results as the arrangement of Fig. 1 with shorter bridging means. Thus, referring to Fig. 3 it will be seen that adjacent portions of a pair of braiding heads A and B are diagrammatically illustrated. A pair of bridging means C and D extend between these braiding heads A and B and are composed only of two moving means each. A pair of switches are located at each of the junctions between the bridging means C and D and the braiding heads A and B. Thus, eight switches 80a—80h are provided as indicated in Fig. 3. In one position of these switches, the switches 80a, 80c, 80f, and 80h are in neutral positions where they allow yarn carriers to move between horn gears 81a and 83a, 82a and 83b, 81d and 84a, and 82d and 84b. When the switches 80a, 80c, 80f, and 80h are in their neutral position the switch 80b engages the quoit over horn gear 81b, the switch 80d engages the quoit over the horn gear 82b, the switch 80e engages the quoit over horn gear 81c, and the switch 80g engages the quoit over horn gear 82c, so that in this position of the parts the two braiding heads A and B are combined into a single braiding head. The horn gears of Fig. 3 rotate in the directions indicated by the arrows, and when the switches are simultaneously turned to the position indicated above in order to provide a single braiding head from the two braiding heads A and B yarn carriers moving from gear 81b to gear 81c will move freely to the gear 81d and from the latter to the horn gear 84a to the right across the bridging means D, as viewed in Fig. 3. In the same way all of the yarn carriers which happen to be in engagement with the horn gears 81b, 81c, 82b, and 82c move from these horn gears into the single track of the single combined braiding head, and thus this embodiment makes it possible in a very simple way to combine two braiding heads into one.

When it is desired to switch back to braiding an article with each braiding head A and B, the switches 80a—80h are simultaneously turned respectively to positions where switches 80b, 80d, 80e, and 80g are neutral and where switches 80a, 80c, 80f, and 80h respectively engage the quoits over the gears 83a, 83b, 84a, and 84b. In this position of the switches yarn carriers in engagement with the bridging means C and D at the moment of switching over will automatically move into the individual braiding heads A and B and these braiding heads will now operate independently to braid two separate articles.

Figure 8:
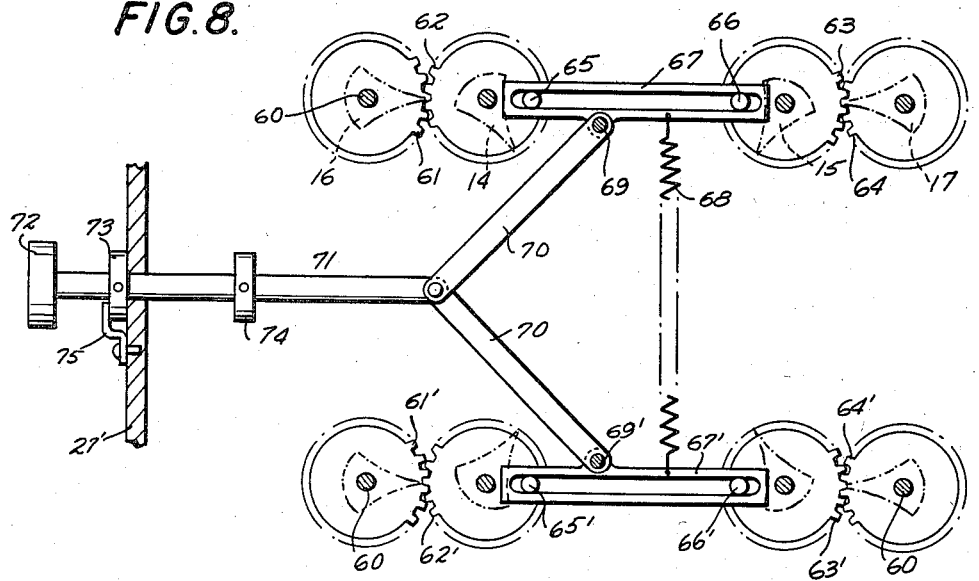
Fig. 8 is a partly sectional, partly fragmentary plan view of another mechanism which may be used to operate switches shown in Figs. 2 and 3.

It is apparent that the switches shown in Fig. 3 may all be turned simultaneously between their positions with the same mechanism which is shown in Fig. 8 and which has been described above. However this mechanism of Fig. 8 when used with the switches of Fig. 3 will be oriented so that the bar 71 extends between the braiding heads rather than across the same.

Of course, with the embodiment of Fig. 2 the mechanisms shown in Figs. 6 and 8 are both required, in this case the mechanism shown in Fig. 6 being located below that of Fig. 8 so that there is no conflict. Also, if desired, the bar 71 may extend in a direction opposite to the bar 39 to the opposite side of the machine.

The article formed by the above described structures and processes is shown in Fig. 11. This article may include an elongated braided portion 90 of any desired length which may branch into separate braided portions 91 also of any desired length and which may again merge into a single braided portion 92 of any desired length. Of course it is also possible to start with a pair of independent braided articles corresponding to portions 91 which may then be combined into a single braided article having the same or a greater number of yarns, as was indicated above. Up to the present time when it was necessary to provide continuous tubes which have branches as indicated in Fig. 11, it was necessary to sew together at least two pieces. In contrast, with the present invention the article of Fig. 11 is provided, and this braided article is unique in that it is seamless and in that it has a perfectly closed crotch. This article is particularly adapted for use as an arterial prosthesis and also may be used for electrical or thermal insulation.

It will be understood that each of the elements described above, or two or more together, may also find a useful application in other types of braiding differing from the types described above.

While the invention has been illustrated and described as embodied in a process and apparatus for uniting a pair of braided articles into a single braided article and for branching a single braided article into a pair of braided portions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a braiding process, the steps of independently operating a pair of braiding heads to simultaneously form two separate braided articles; and switching at a given moment yarn carriers from only part of one braiding head, while maintaining the remainder of said one braiding head inoperative, to only part of the other braiding head, while maintaining the remainder of said other braiding head inoperative, and from said part of said other braiding head to said part of said one braiding head to form from said two braiding heads a single braiding head, whereby the two separate braided articles are united into a single braided article.

2. In a braiding process, the steps of simultaneously directing yarn carriers in opposite directions respectively along a pair of intersecting endless sinuous paths both of which are arranged along a single first circle; and then switching yarn carriers from said paths to one pair of intersecting sinuous paths arranged along a second circle part of which coincides with said first circle and along another pair of intersecting sinuous endless paths arranged along a third circle completely independent of said second circle and part of which also coincides with said first circle, and while directing the yarn carriers along said first-mentioned intersecting paths arranged along said first circle preventing yarn carriers from moving along those portions of said second and third circles which do not coincide with said first circle, whereby a single braided article formed during movement of said yarn carriers along said first-mentioned intersecting paths will be branched into a pair of braided portions during movement of the yarn carriers along the paths which are arranged along said second and third circles.

3. In a braiding process, the steps of independently operating a pair of braiding heads to simultaneously form two separate braided articles; switching at a given moment yarn carriers from only part of one braiding head, while maintaining the remainder of said one braiding head inoperative, to only part of the other braiding head, while maintaining the remainder of said other braiding head inoperative, and from said part of said other braiding head to said part of said one braiding head to form from said two braiding heads a single braiding head, whereby the two separate braided articles are united into a single braided article; adding additional yarn carriers before said switching and formation of said single braiding head; and cutting from the finished article the free ends of yarns from said added yarn carriers.

4. In a braiding process, the steps of simultaneously directing yarn carriers in opposite directions respectively along a pair of intersecting endless sinuous paths both of which are arranged along a single first circle; then switching yarn carriers from said paths to one pair of intersecting sinuous paths arranged along a second circle part of which coincides with said first circle and along another pair of intersecting sinuous endless paths arranged along a third circle completely independent of said second circle and part of which also coincides with said first circle, and while directing the yarn carriers along said first-mentioned intersecting paths arranged along said first circle preventing yarn carriers from moving along those portions of said second and third circles which do not coincide with said first circle, whereby a single braided article formed during movement of said yarn carriers along said first-mentioned intersecting paths will be branched into a pair of braided portions during movement of the yarn carriers along the paths which are arranged along said second and third circles; and changing the number of yarn carriers before directing the latter from said paths arranged along said first circle to said paths arranged along said second and third circles.

5. In a braiding machine, in combination, a pair of braiding heads; at least one bridging means bridging said braiding heads for guiding yarn carriers from one braiding head to the other braiding head and from said other braiding head back to said one braiding head; and switching means located at the junctions between said braiding heads and bridging means and having one position for directing yarn carriers from said braiding heads to said bridging means and for preventing any yarn carriers from moving along predetermined portions of said pair of braiding heads and having another position for preventing yarn carriers from moving from said braiding heads to said bridging means.

6. In a braiding machine, in combination, a pair of braiding heads each of which includes a given number of moving means for moving yarn carriers along given paths; a pair of bridging means bridging said braiding heads for guiding yarn carriers from one braiding head to the other braiding head and from said other braiding head back to said one braiding head, each of said bridging means including a number of moving means less than said given number of moving means; and switching means located at the junctions between said braiding heads and bridging means and having one position for directing yarn carriers from said braiding heads to said bridging means and for eliminating from the braiding operation a number of moving means in each braiding head equal to the number of moving means in each bridging means and having another position for preventing yarn carriers from moving from said braiding heads to said bridging means.

7. In a braiding machine, in combination, a pair of braiding heads each of which includes a given number of moving means for moving yarn carriers along given paths; a pair of bridging means bridging said braiding heads for guiding yarn carriers from one braiding head to the other braiding head and from said other braiding head back to said one braiding head, each of said bridging means including a number of moving means less than said given number of moving means; and switching means located at the junctions between said braiding heads and bridging means and having one position for directing yarn carriers from said braiding heads to said bridging means and for eliminating from the braiding operation a number of moving means in each braiding head which is less than the number of moving means in each bridging means and having another position for preventing yarn carriers from moving from said braiding heads to said bridging means.

8. In a braiding machine, in combination, a pair of braiding heads; a first pair of bridging means bridging said braiding heads for guiding yarn carriers from one braiding head to the other braiding head and from said other braiding head back to said one braiding head; switching means located at the junctions between said braiding heads and bridging means and having one position for directing yarn carriers from said braiding heads to said bridging means and for preventing any yarn carriers from moving along predetermined portions of said braiding heads and having another position for preventing yarn carriers from moving from said braiding heads to said bridging means; a second pair of bridging means respectively bridging portions of said first pair of bridging means for directing yarn carriers from said first pair of bridging means respectively along given paths back to said first pair of bridging means; and second switch means located at the junctions between said first and second pairs of bridging means for optionally switching yarn carriers between said pairs of bridging means.

9. In a braiding machine, in combination, a pair of braiding heads each of which has an inner portion and an outer portion, said braiding heads being arranged with said inner portions adjacent to each other and said outer portions distant from each other; a pair of bridging means bridging said outer portions of said braiding heads for guiding yarn carriers from one braiding head to the other braiding head and from said other braiding head back to said one braiding head; and switching means located at the junctions between said braiding heads and bridging means and having one position for directing yarn carriers from said outer portions of said braiding heads to said bridging means and for preventing the yarn carriers from moving along said inner portions of said braiding heads and having another position for preventing yarn carriers from moving from said braiding heads to said bridging means.

10. In a braiding machine, in combination, a pair of braiding heads each of which includes a given number of moving means for moving yarn carriers along given paths; a pair of bridging means bridging said braiding heads for guiding yarn carriers from one braiding head to the other braiding head and from said other braiding head back to said one braiding head, each of said bridging means including a number of moving means less than said given number of moving means; and switching means located at the junctions between said braiding heads and bridging means and having one position for directing yarn carriers from said braiding heads to said bridging means and for eliminating from the braiding operation a number of moving means in each braiding head different from the number of moving means in each bridging means and having another position for preventing yarn carriers from moving from said braiding heads to said bridging means.

(References on following page)

References Cited in the file of this patent

UNITED STATES PATENTS

| | | |
|---|---|---|
| 487,149 | Krouse | Nov. 29, 1892 |
| 898,938 | Thun | Sept. 15, 1908 |
| 933,341 | Rahm | Sept. 7, 1909 |
| 936,492 | Thun et al. | Oct. 12, 1909 |
| 1,084,442 | Jones | Jan. 13, 1914 |
| 1,158,603 | Webb | Nov. 2, 1915 |
| 1,978,259 | Gastrich | Oct. 23, 1934 |
| 2,102,829 | Boivin | Dec. 21, 1937 |
| 2,354,212 | Jeckel | July 25, 1944 |